(12) United States Patent
Murray et al.

(10) Patent No.: US 8,876,343 B2
(45) Date of Patent: Nov. 4, 2014

(54) LIGHTING SYSTEM ARRANGED IN VEHICLE DOOR

(75) Inventors: Andrew John Murray, Colchester (GB); Torsten Gerhardt, London (GB); John K. Harding, Leigh-on-Sea (GB); Will Farrelly, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 894 days.

(21) Appl. No.: 13/027,630

(22) Filed: Feb. 15, 2011

(65) Prior Publication Data
US 2011/0241544 A1    Oct. 6, 2011

(30) Foreign Application Priority Data

Mar. 30, 2010  (GB) .................................. 1005283.5

(51) Int. Cl.
| | |
|---|---|
| *B60Q 1/14* | (2006.01) |
| *B60Q 1/26* | (2006.01) |
| *B60Q 3/02* | (2006.01) |
| *B60Q 1/32* | (2006.01) |

(52) U.S. Cl.
CPC .............. *B60Q 3/0216* (2013.01); *B60Q 1/323* (2013.01); *B60Q 3/0293* (2013.01); *B60Q 2400/40* (2013.01); *Y10S 362/80* (2013.01); *Y10S 362/802* (2013.01)
USPC ........... 362/501; 362/488; 362/545; 362/800; 362/802; 315/77; 315/80; 315/84

(58) Field of Classification Search
USPC ........ 315/77, 80, 84; 362/488, 501, 545, 800, 362/802
See application file for complete search history.

(56) References Cited

U.S. PATENT DOCUMENTS

| | | | | |
|---|---|---|---|---|
| 5,174,643 | A | * 12/1992 | Priesemuth .................... | 362/464 |
| 6,000,822 | A | * 12/1999 | Polizzi et al. ................. | 362/488 |
| 2005/0068785 | A1* | 3/2005 | Takeda et al. ................. | 362/506 |

FOREIGN PATENT DOCUMENTS

| | | |
|---|---|---|
| DE | 19608898 A1 | 10/1996 |
| EP | 1363810 B1 | 5/2007 |
| FR | 1518902 | 3/1968 |
| FR | 2938219 A1 | 5/2010 |
| JP | 2001206141 A | 7/2001 |
| WO | 0136870 A1 | 5/2001 |
| WO | 2007003006 A1 | 1/2007 |

* cited by examiner

*Primary Examiner* — Douglas W Owens
*Assistant Examiner* — Thai Pham
(74) *Attorney, Agent, or Firm* — Vichit Chea; Price Heneveld LLP

(57) ABSTRACT

A lighting system for a motor vehicle 1 is disclosed in which a light source 4a, 4b, 4c, 4d is fitted to the inside of each door 2L, 2R, 3L, 3R so as to selectively provide interior lighting when the respective door 2L, 2R, 3L, 3R is closed and puddle lighting when it is open. Each of the light sources 4a, 4b, 4c, 4d is mounted close to a waistline of the door 2L, 2R, 3L, 3R to which it is attached and is arranged to project light in a downward direction so as not to provide a distraction for a driver of the motor vehicle 1.

16 Claims, 8 Drawing Sheets

LIGHTING SYSTEM ARRANGED IN VEHICLE DOOR

FIELD OF THE INVENTION

The present invention generally relates to an interior lighting system for a motor vehicle and, in particular, to a door mounted lighting system fulfilling multiple lighting requirements.

BACKGROUND OF THE INVENTION

Some vehicles are equipped with external lighting systems, commonly combined into the external door mirror, to illuminate a ground area adjacent a door when the door is open. Such lighting is often referred to as "puddle lighting" because it enables a user of the motor vehicle to see puddles or obstacles on the ground during exit from the vehicle, an example of such a puddle lighting system is disclosed in JP2001206141. Although such external lighting systems are able to illuminate the ground on the outer side of an open door, an occupant, when climbing into or out of a vehicle needs to step onto the area between the door aperture and the interior side of the open door. With such an exterior mirror lighting system this ground is not properly illuminated because the area is screened from the light source by the door.

WO 01/36870 describes a lighting system arranged around the bottom interior edge of a vehicle door to provide puddle lighting. Although such a system provides better lighting for passenger ingress and egress, additional lighting is required for interior lighting purposes, such as task lighting.

With the ever increasing demands on motor vehicle manufacturers to keep down the cost, weight and complexity of operation of their vehicles, there exists a need to provide a lighting system that can combine one or more interior lighting tasks with puddle lighting in a cost-effective manner.

EP 1363810 describes the use of high intensity lights mounted to an interior mirror to provide ground illumination. Such lights may also be used as task lighting to facilitate map reading and other activities. It is a disadvantage of such an arrangement that the lights are mounted to the interior mirror and are therefore directly within a driver's line of sight. This could potentially be a distraction and could cause glare if used while driving.

It is therefore desirable to provide a lighting system for a motor vehicle which is able to provide both interior lighting and exterior puddle lighting without causing glare or being a distraction to a driver of the motor vehicle.

SUMMARY OF THE INVENTION

According to one aspect of the present invention, there is provided a lighting system for a motor vehicle comprising an elongate light source arranged substantially horizontally along the door below a waistline of a door of the motor vehicle on an interior side of the door wherein, when the door is in a closed position, light is directed when required from the light source in a downward direction to illuminate part of an interior of the motor vehicle and, when the door is in an open position, light is directed from the light source in a downward direction to illuminate the ground adjacent the motor vehicle.

According to additional aspects of the present invention, the system may include a shade to prevent light from the light source from being projected upwardly. The light source may be mounted near to the waistline of the door. In this way, the light source will be below the driver's line of sight, so reducing the likelihood of distraction and glare. The door may include an inner door casing and the light source may be mounted between a sill portion of the inner door casing and an armrest portion of the inner door casing. The door may include an inner door casing and the light source may be mounted in a recess formed by the inner door casing. The recess may have a mouth and light from the light source may be emitted through the mouth of the recess. The mouth of the recess may be an elongate mouth and may be arranged horizontally along the inner door casing. Alternatively, the door may include an inner door casing having an aperture into which is fitted a light housing and the light source may be mounted in the light housing. The light housing may have a mouth and light from the light source may be emitted through the mouth of the light housing. The mouth of the housing may be an elongate mouth and may be arranged horizontally along the inner door casing. The light source may be one of an elongate light source and a number of discrete lamps arranged in a row and may be arranged substantially horizontally along the door. The light source may be a strip light.

According to further aspects of the invention, the system may include a sensor to sense whether the door is open or closed and the light source may be automatically illuminated whenever the door is sensed to be open. The light source may be an array of light emitting diodes (LEDs). The array of LEDs includes LEDs of differing color so that the color of the light emitted by the light source can be changed. The system may further comprise at least one human machine interface to control operation of the light source. At least one human machine interface may be operable by a user of the motor vehicle to change the color of the light emitted from the light source. The light source may be operable at more than one intensity. The light source may be operable at least at a high intensity and a low intensity. The system may be operable to provide, when the door is closed, a low intensity of lighting for mood lighting and a higher intensity of lighting for task lighting and, when the door is open, an even higher intensity of lighting for puddle lighting. The light source may be operated at a high intensity when the door is opened to illuminate the ground in the vicinity of the door opening. The human machine interface may be operable to control the illumination state of the light source when the door is closed. The illumination state may include whether the light source is switched on or off. The illumination state may include the intensity of illumination provided.

According to another aspect of the present invention, a vehicle lighting system is provided which includes an elongate light source arranged along an interior side of a vehicle. When the door is in a closed position, light is directed from the light source in a downward direction to illuminate an interior of the vehicle. When the door is in an opened position, light is directed from the light source in a downward direction to illuminate ground adjacent the vehicle.

According to yet a further aspect of the present invention, there is provided a motor vehicle which includes a door and an elongate light source arranged along an interior side of the door. When the door is in a closed position, light is directed from the light source in a downward position to illuminate an interior of the motor vehicle. When the door is in an opened position, light is directed form the light source in a downward direction to illuminate ground adjacent the vehicle.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
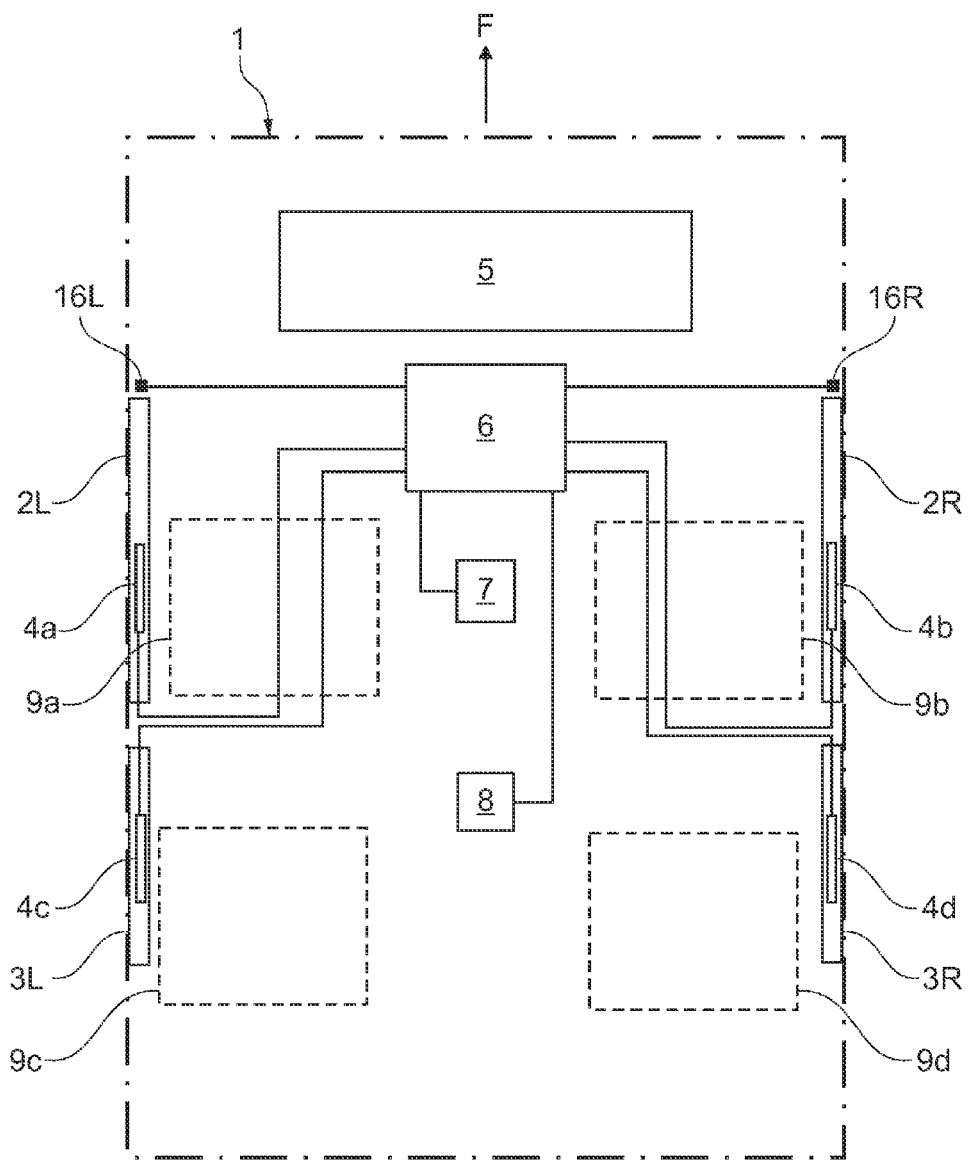
FIG. 1 is a schematic representation of a motor vehicle having a lighting system, according to one embodiment.

With particular reference to FIG. 1, there is shown motor vehicle 1 having a source of motive power, such as an engine or motor 5 for driving the motor vehicle 1 in at least a forward direction as indicated by the arrow "F." The motor vehicle 1 has two front and two rear passenger doors 2L, 2R and 3L, 3R, respectively, each of which has a light source 4a, 4b, 4c and 4d attached thereto.

Each of the two front doors 2L, 2R has a sensor 16 associated with it to sense whether the respective door 2L, 2R is in an open or closed state. The door sensors 16 can be in the form of simple switches that change state from open to closed or vice versa when the state of the respective door 2L, 2R is changed or could be any other suitable form of sensor. In practice, the rear doors 3L and 3R also have door sensors associated with them to sense the open or closed state of the rear doors 3L, 3R but these are not shown in FIG. 1.

A passenger seat 9a, 9b, 9c and 9d is located adjacent each of the doors 2L, 2R; 3L and 3R upon which in use an occupant of the motor vehicle can be accommodated. The size and positioning of the seats 9a to 9d is merely representative and does not necessarily indicate the actual size or positioning of the seats 9a to 9d.

An electronic controller 6 is provided to control the operation of the light sources 4a to 4d and, in the example shown, the electronic controller 6 is a lighting controller 6. It will however be appreciated that the functionality of this controller 6 could be incorporated into one or more electronic controllers fitted to the motor vehicle 1 and need not be a separate controller.

A front human machine interface device 7 is provided for the use of the front seated occupants and a second human machine interface 8 is provided for the use of rear seated occupants. The front and rear human machine interfaces 7 and 8 can be simple on/off switches or could be more sophisticated devices allowing the intensity of one or more of the light sources 4a to 4d to be varied or be used to change the color of the light emitted from the light sources 4a to 4d if such a facility exists. It will be appreciated that these human machine interfaces 7 and 8 could be formed as part of a more generalized control panel or could be individual door mounted input devices.

In the embodiment shown in FIG. 1, each of the light sources 4a to 4d is formed of an array of light emitting diodes (LEDs) and the lighting controller 6 is operable to switch on and off each light source 4a to 4d based upon inputs received from the front and rear human machine interfaces 7 and 8. The electronic controller 6 is also operable to automatically switch on each of the front light sources 4a and 4b when the door sensor 16L, 16R associated with that door 2L, 2R indicates that the respective door 2L, 2R is in an open position irrespective of the commands received from the front and rear human machine interfaces 7 and 8.

The electronic controller 6 is also operable to provide more than one lighting intensity from at least the two front light sources 4a, 4b and in the example shown two lighting intensities are obtainable, a low intensity and a high intensity. The low intensity is used to provide mood or ambient lighting within the vehicle 1 and may be automatically switched on when the main lighting of the vehicle is switched on or may be switched on by the driver of the vehicle using the front human machine interface 7.

The rear light sources 4c, 4d may in some embodiments have only on and off states, in which case, in the on state, they will operate at the high intensity level or may have high and low intensity levels, in which case the high intensity level can be individually demanded by each of the rear seat occupants or passengers to act as task lighting, such as, for example, reading lights and the low intensity level is demanded by a driver of the motor vehicle 1 using the front human machine interface 7.

In the embodiment shown in FIG. 1, the front human machine interface 7 allows a driver of the motor vehicle to switch on and off all the light sources 4a to 4d at the low intensity level so as to provide mood lighting for the vehicle interior and to select when required the high intensity level for the light source 4a located adjacent to the driver's seat 9a. The occupants of the seats 9b to 9d can, via the human machine interfaces 7 and 8, switch on and off the light sources 4b to 4d located adjacent their seat to provide the high intensity level required for reading but are not able to switch on and off the mood lighting which will stay on if selected by the driver even if a passenger switches off the light source 4b to 4d located next to their seat. It will be appreciated that other combinations of light switching could be used and that the invention is not limited to the switching and control combination used in FIG. 1.

In order to provide the maximum puddle illumination, the light sources 4a, 4b are always automatically switched on at the high intensity level when the respective door 2L, 2R is moved to the open position. It will be appreciated that the rear light sources 4c, 4d will similarly be switched on at the high intensity level when the respective door 3L, 3R is open. When the respective door 3L, 3R is closed, the respective light source 4c, 4d returns to the illumination state set by the adjacent occupant or the driver.

For example, if the driver has switched on mood lighting and the left hand rear door 3L is opened, the light source 4c is automatically switched by the lighting controller 6 from the low intensity level to the high intensity level and is then switched back to the low intensity level when the door 3L is closed. Similarly, if there is no mood lighting switched on and the right hand rear door 3R is opened, the light source 4d is switched from an off state to a high intensity level when the rear door 3R is opened and is switched off when the rear door 3R is closed.

As yet another example, if the right hand front light unit 4b is in the high intensity state when the right hand front door 2R is opened, it remains illuminated at the high intensity level while the door 2R is open and remains at that high level of illumination when the door 2R is closed.

It will be appreciated that each of the light sources 4a to 4d could have more than two levels of illumination so that, for example, there could be three lighting intensities: a low intensity for mood lighting, a higher intensity for task use while the door is closed, and a very high or maximum intensity for puddle illumination. Alternatively, each of the light sources 4a to 4d could have only one intensity level so that each of the light sources 4a to 4d is either on or off. Furthermore, each of the light sources 4a to 4d could be controlled to have variable intensity between off and a maximum intensity used for puddle illumination when the associated door is open.

It will also be appreciated that each of the LED arrays could be comprised of LEDs of differing color and that the lighting controller 6 could be operable to vary the intensity of illumination of the various colored LEDs so as to produce different illumination colors. This facility is particularly advantageous if the light sources 4a to 4d are to be used for mood lighting. Examples of controlling variable color LED displays are disclosed in WO2007003006 and DE19608898. The light sources 4a to 4d need not be LED arrays as other forms of light sources could be used such as strip lights or electroluminescent lights such as neon lights.

Figure 2:
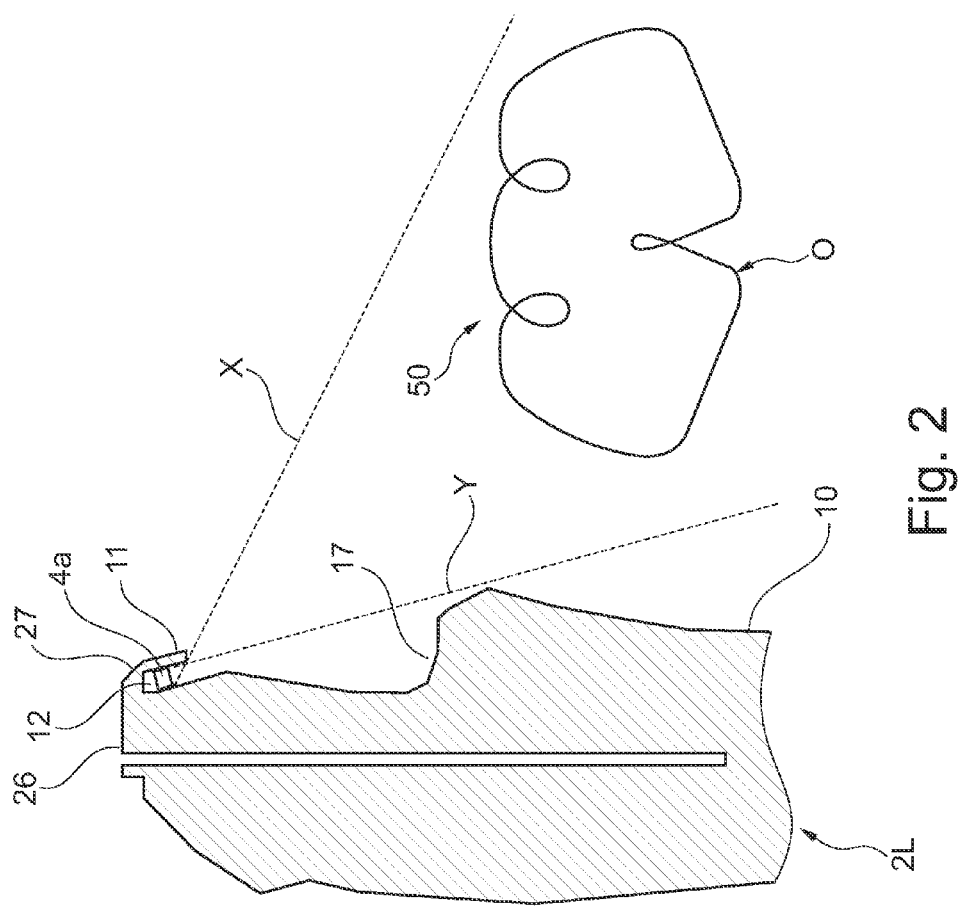
FIG. 2 is a partial schematic section of a door of the motor vehicle shown in FIG. 1 showing a light source forming part of the lighting system, according to one embodiment.
Figure 3:
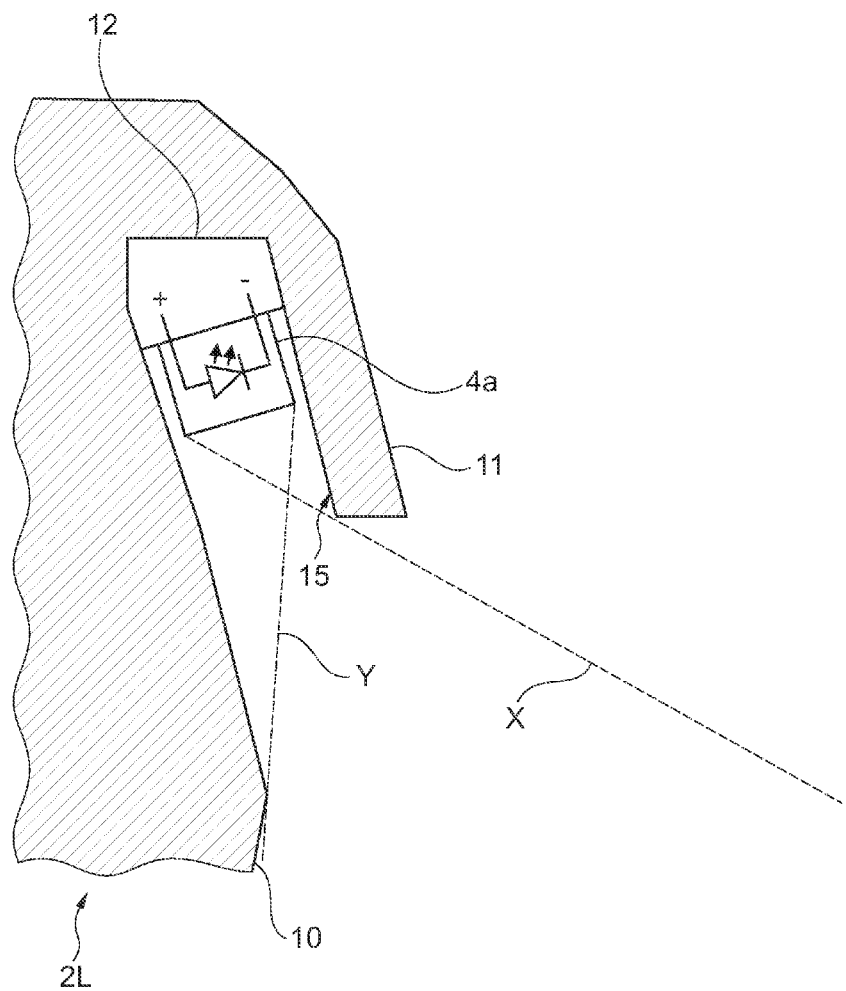
FIG. 3 is an enlarged end view of the light source shown in FIG. 2.

Referring now to FIGS. 2 and 3, there is shown in greater detail the light source 4a mounted on the left hand front door 2L. The light source 4a is mounted in a recess 12 formed as an integral part of an inner door casing 10 of the door 2L. The light source 4a is mounted deep in the recess 12 so that an outer wall 1 of the recess forms a shade for the light source 4a. This ensures that light from the light source is directed downwardly as indicated by the dotted lines X and Y which indicate, respectively, the upper and lower boundaries of the light issuing from the light source 4a when it is illuminated. Note that light from the light source 4a travels down the recess 12 which forms a guide channel and exits via a mouth 15 defined by an aperture in the inner door casing 10 to form a pool of light on a lap 50 of an occupant "O" seated adjacent to the door 2L but does not spread upwards to cause glare or distract the driver.

The positioning of the light source 4a is below but preferably near to a waistline 26 of the door 2L so that the light source is well above the level of the lap 50 of the occupant "O" to allow it to be directed at a relatively steep angle downwards to provide good illumination for use as a task light such as a reading light and to provide a pool of light close to the bottom of the door 2L when the door is opened to act as puddle lighting. In one non-limiting example, the light source was mounted 0.25 m above the level of a lap of a seated occupant. The term "waistline" as meant herein is the juncture of the mainly glazed upper door with the unglazed lower door.

In the embodiment shown in FIG. 2, the light source 4a is mounted between a sill portion 27 of the inner door casing 10 and an armrest portion 17 of the inner door casing 10. It will be appreciated that if the light source 4a were to be mounted below the level of the armrest 17, it could not efficiently illuminate the lap of an occupant and could therefore only serve as puddle lighting.

Figure 4:
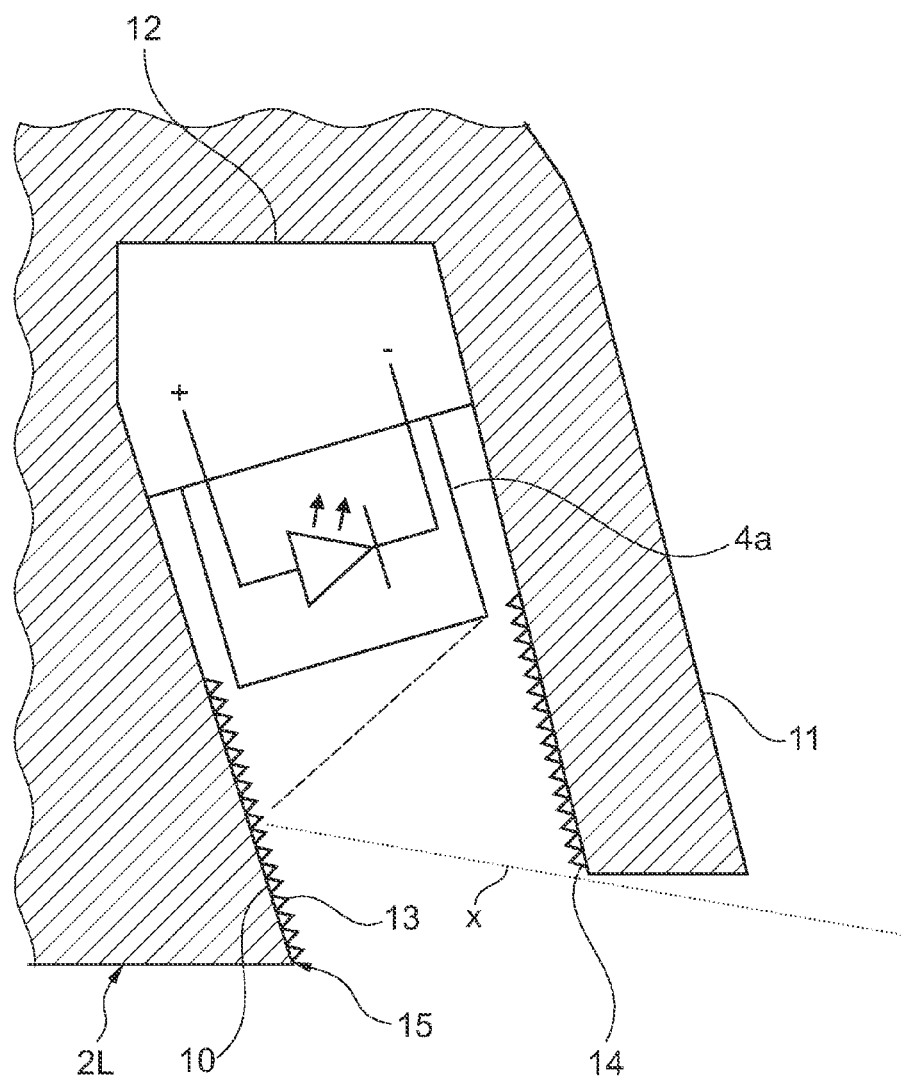
FIG. 4 is a view similar to FIG. 3, but showing a modification to the detailed construction of a recess in which the light source is housed.

Referring now to FIG. 4, there is shown part of a lighting system that is in most respects identical to that shown and described with respect to FIGS. 2 and 3 and so will not be described again in detail. The only significant difference between this embodiment and that previously described is that the region of the recess 12 located adjacent the mouth 15 has a coating or surface finish 13, 14 that is either non-reflective or is textured so as to reduce the amount of light scatter. It is important that light cannot reflect off the lower wall of the recess 12 as reflected light could potentially travel upwards even though the light source 4a is located behind the shade 11. On FIG. 4, "X" indicates the upper limit of the light from the light source 4a if reflection is possible and the angle of this upper limit is undesirably horizontal and so needs to be avoided. This reflection is prevented by the use of the non-reflective coating or surface finish 13.

Figure 5:
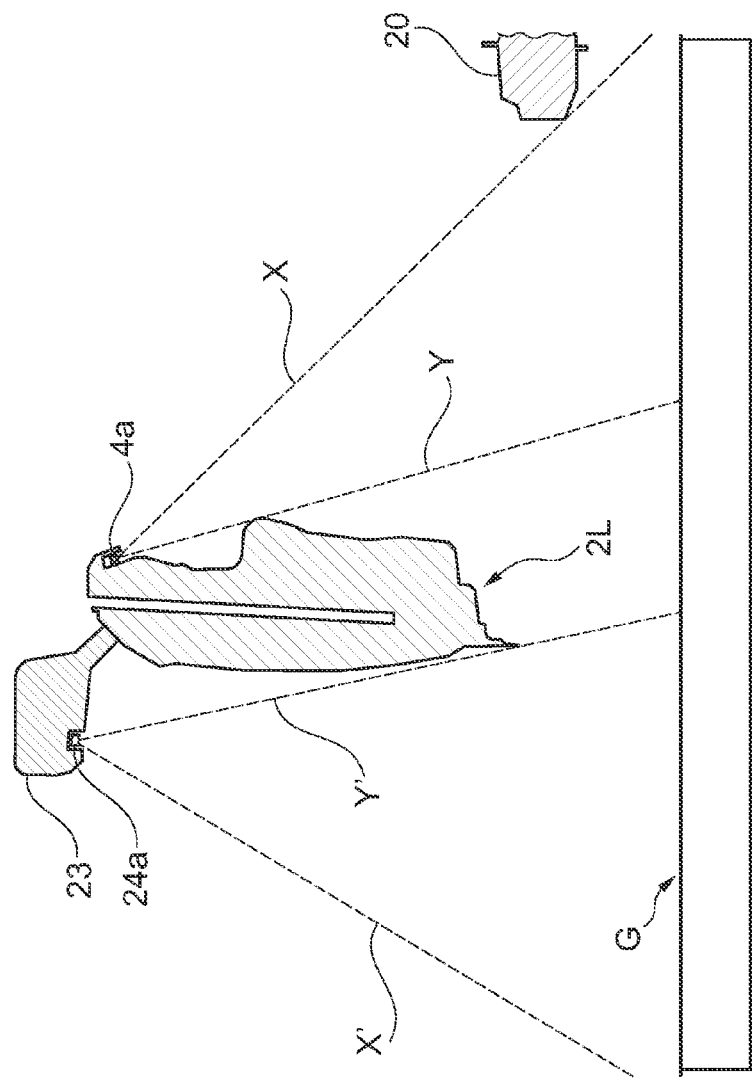
FIG. 5 is a view looking towards a front end of the motor vehicle shown in FIG. 1 with a front left hand door in an open position.

Referring now to FIG. 5, there is shown the respective illumination areas for a prior art exterior mirror mounted puddle light and a puddle light formed in accordance with one embodiment of the lighting system as applied to the left hand side front door 2L. The door 2L has the exterior mirror 23 mounted just above a waistline of the door 2L and there is a light source 24a mounted in the lower edge of a casing for the exterior mirror 23. Light from the light source 24a will, when the light source 24a is illuminated, fall upon the ground "G" in a pool defined by the upper and lower limits X' and V. It will be noted that due to the shielding effect of the door 2L there is no illumination of the ground "G" inside of the door 2L and it is this area that a person exiting the vehicle 1 will first step upon.

Conversely, the area illuminated by the light source 4a mounted according to this disclosed embodiment on the inside of the door 2L falls to the inside of the opened door 2L. Its coverage is indicated by the upper and lower limits X and Y. In this case, a large proportion of the ground between the opened door 2L and a lower sill 20 of a frame for the door 2L is illuminated and it is this region of the ground "G" that is first trod upon when a person exits the motor vehicle 1.

Figure 6:
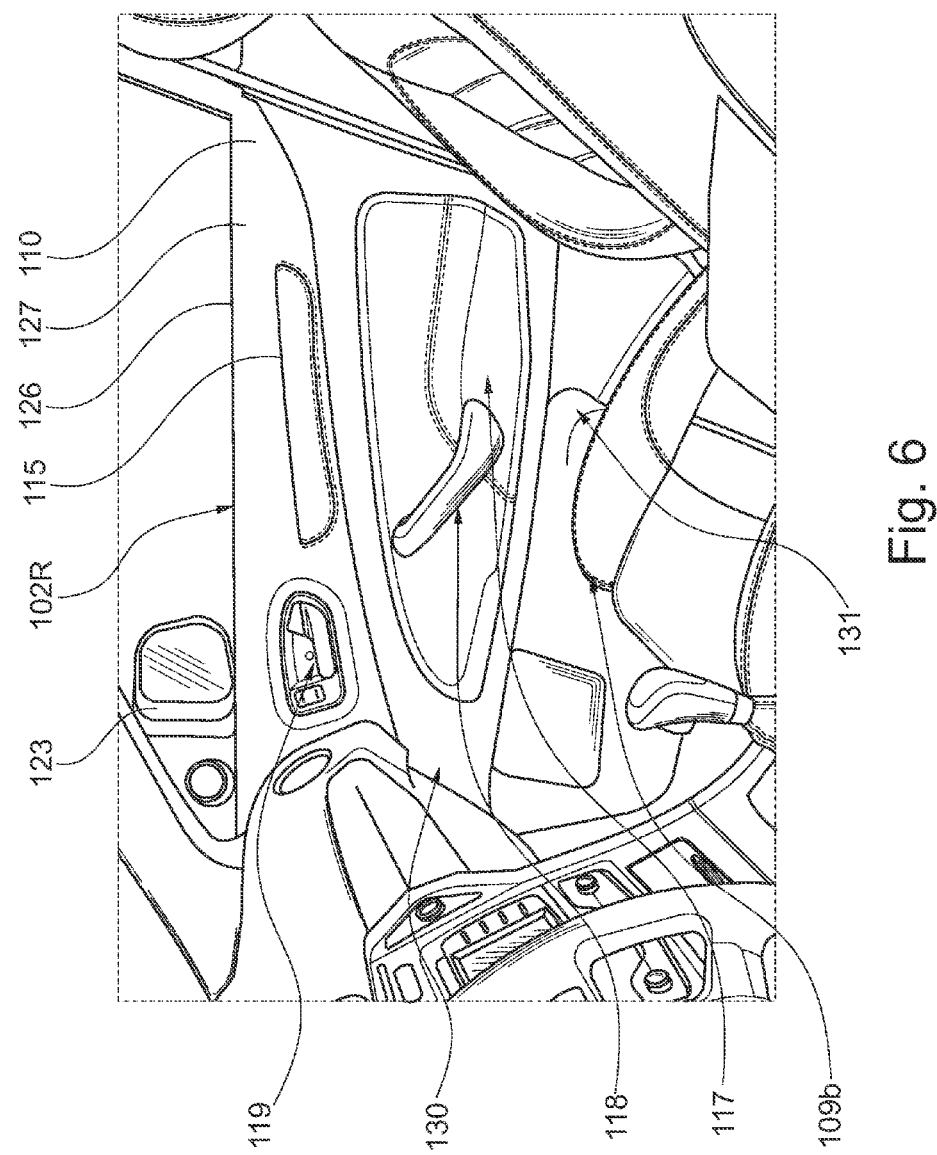
FIG. 6 is a pictorial side view of a front right hand front door in a closed position as viewed from a left hand side front seat of the vehicle showing the elongate nature of the light source.

Referring now to FIG. 6, there is shown an embodiment of the lighting system which is in many respects the same as that described with reference to FIGS. 1 and 2. A light source (not visible) is mounted in a recess defined by an inner door casing 110 such that light can issue out through an aperture or mouth 115 in the inner door casing 110 in a downward direction.

The inner door casing 110 defines an armrest 117 and a door pull 118 is attached to the inner door casing 110. An internal door release handle 119 is also supported by the inner door casing 110. The door is in this case a right hand front door 102R and an external door mirror 123 is mounted on an outer surface of the door 102R just above a waistline 126 of the door 102R. The inner door casing 110 has an upper portion extending away from the waistline 126 to define a sill portion 127, a central portion 130 defining the armrest 117 and a lower portion 131 located below the central portion 130.

The light source is shown in an illuminated state projecting a pool of light onto an adjacent seat 109b. In the example shown, the light source is in the form of an array of 32 LEDs of 10 mA each sold under the trade name Brightstrip™ and produced by Agilight. As previously described, the control of the light source via a controller (not shown) is manually obtained by the use of human machine interfaces and automatically via a sensor associated with the door 102R so that when the door 102R is opened, the light source is automatically illuminated.

As can be seen in one embodiment shown in FIG. 6, the light source projects its light through an elongate aperture so as to provide a very wide beam of light of limited height. It is therefore desirable that the array of LEDs is elongate in shape and is mounted substantially horizontally so as to produce the wide beam of light required. Such a wide beam of light provides excellent illumination for task lighting such as map reading and also for mood lighting and also produces a very wide pool of light on the ground when the door 102R is opened. The restricted height of the aperture 15 reduces the probability of light being reflected upwards from the light source as it exits through the aperture 15 thereby reducing the risk of glare or driver disturbance.

In the embodiment shown, the light source is arranged to be operable at a low intensity for use as mood lighting when the door 102R is closed and at a high intensity for use as task lighting when the door 102R is closed and as puddle lighting when the door 102R is open. However, it will be appreciated that the light source could be operable in response to an operator command input through a human machine interface to be illuminated at more than two levels of illumination so that, for example and without limitation, it could be illuminated at a low intensity for mood lighting, a higher intensity for task use while the door 102R is closed and at a even higher or maximum intensity when the door 102R is open.

Figure 7A:
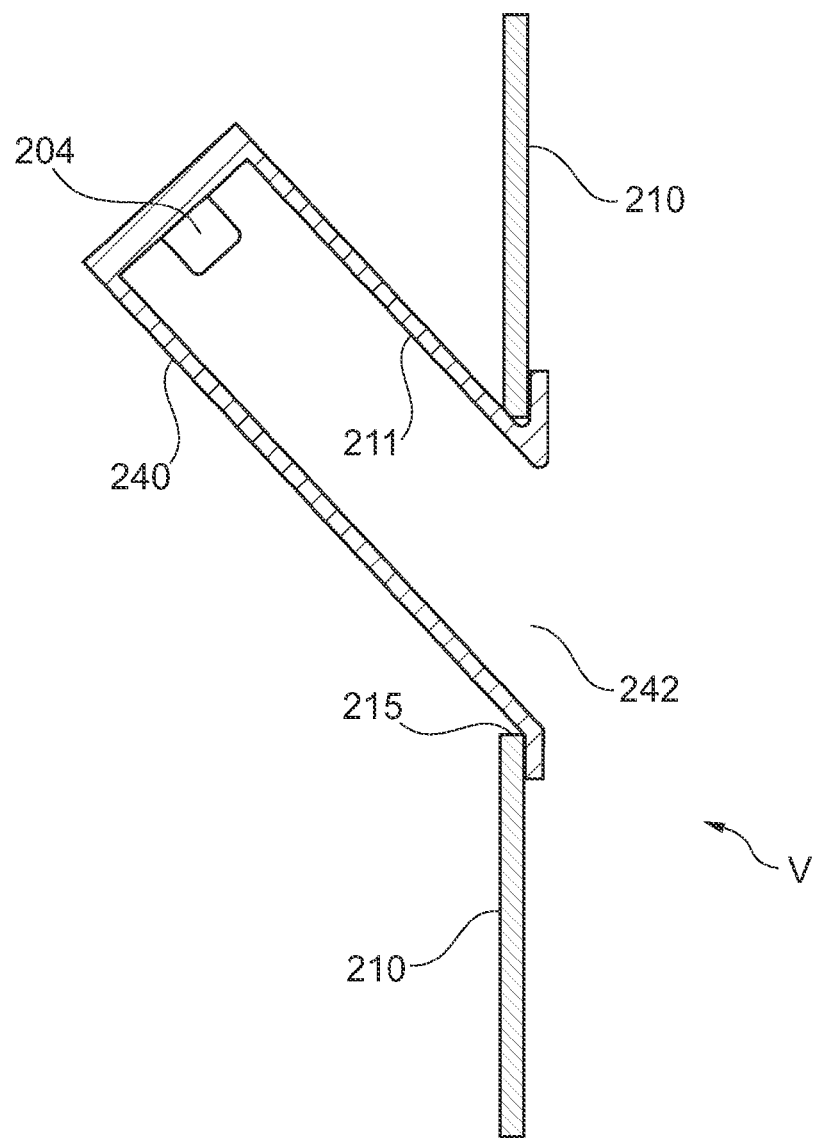
FIG. 7A is a schematic cross section through a light housing, according to a second embodiment showing a light source fitted in the housing.
Figure 7B:
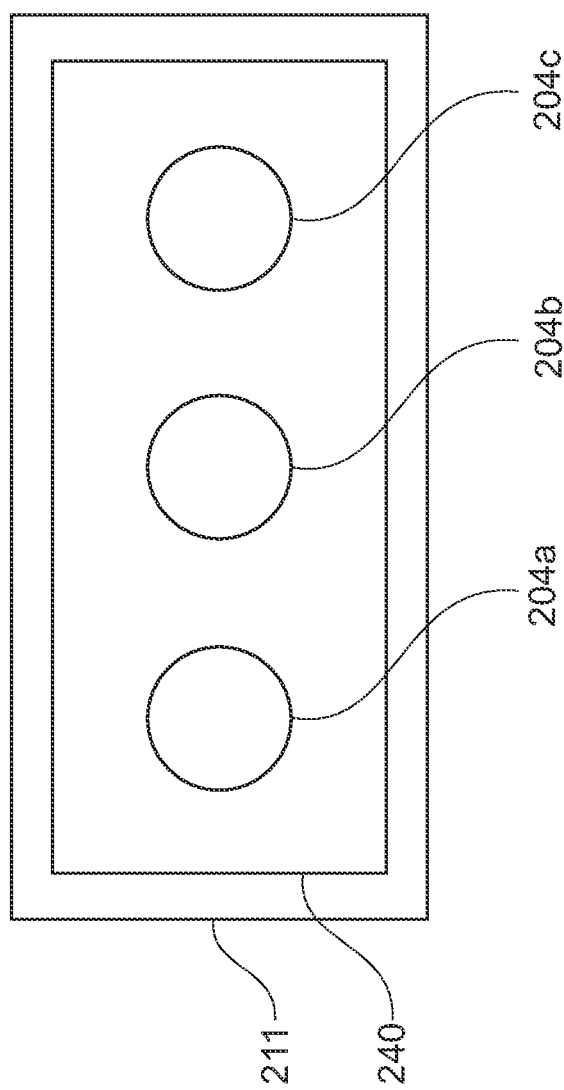
FIG. 7B is a view in the direction of arrow V on FIG. 7A.

Referring now to FIGS. 7A and 7B there is shown a lighting system according to a second embodiment which in most respects operates and is controlled in the same manner as the lighting system described with reference to FIGS. 1 and 2, but differs in that the light source 204 is mounted in a light housing 240 rather than in a recess formed as an integral part of the inner door casing 210. In this case, the inner door casing 210 has a simple aperture 215 formed in it into which the light housing 240 is fitted. As with other embodiments, the housing is fitted such that light from the light source 204 is directly downwardly and preferably the inner surface of the housing 240 is non-reflective, has a non-reflective coating applied to it or has a surface finish to reduce reflections. An upper wall 211 of the housing 240 in combination with the inner door casing 210 located above the housing 240 prevent light from traveling upwards and therefore act as a shade. The housing 240 has a mouth 242 through which light from the light source issues so as to illuminate the ground when the door to which the housing 240 and light source 204 are attached is open or for task or mood lighting when the door is in a closed state or position.

As before, an LED array or a strip light source such as, for example, an electro-luminescent strip light could be used, but in this case, three individual spot lamps 204a, 204b and 204c are arranged in a row so as to produce an elongate source of light. This allows the shape of the housing 240 to be such that the vertical height of the mouth 242 is considerably less than the horizontal width of the mouth 242. As before, various light intensity levels can be provided if required and the color of the light produced could be varied if the spot lamps 204a, 204b and 204c are capable of color change. As before, the light source 204 is automatically switched on whenever the door to which it is attached is opened and, when the door is in a closed position, the light source is selectively controllable using one or more human machine interface devices so as to provide task lighting or in some embodiments, task lighting and mood lighting. The advantage of such an embodiment is that it could be fitted to many existing types of inner door casings and, in particular, the inner door casing does not need to be specially shaped to accommodate the light source.

Therefore in summary, a lighting system for a motor vehicle according to various embodiments is disclosed that by use of a single light source mounted on an inner side of a passenger door is able to provide both interior lighting and puddle lighting thereby reducing the cost and complexity compared to the use of separate light sources for these tasks.

Although the shape of the mouth through which light from the light source is emitted is in the described examples elongate and is substantially rectangular because this is an easy shape to package on an inner door casing and provides a good spread of light with minimal risk of glare, it will be appreciated that the mouth could be of another shape. For example and without limitation, the mouth could be square, oval, elliptical, circular or polygonal. Irrespective of the shape of the mouth, it will be appreciated that the light source is located so as to direct light in a downward direction and that, preferably, a shade is provided to prevent light from traveling in an upward direction. It will further be appreciated that the light source may comprise of a single lamp, a number of lamps or an array of lamps such as an LED array.

Although in the examples described, the device used to generate the light is itself mounted to the interior side of the door, it will be appreciated that the actual generator of light such as a lamp or LED array could be remotely mounted and light could be supplied to a light emitting unit mounted on the inner side of the door so as to emit light in a downward direction. In such a case, it is the light emitting unit that would constitute the light source as meant herein.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A lighting system for a motor vehicle comprising an elongate light source arranged substantially horizontally within a recess along a door, below a waistline of a door of the motor vehicle, on an interior side of the door; wherein, when the door is in a closed position, light is directed from the light source when required in a downward direction to illuminate part of an interior of the motor vehicle, and when the door is in an open position, light is directed from the light source in a downward direction to illuminate the ground adjacent the motor vehicle;

wherein the recess functions as a light guide channel and has an outer wall that forms a shade to prevent light generated by the light source from being directed in an upward direction; wherein the door includes an inner door casing, and the light source is mounted in the recess formed by the inner door casing; wherein the light source is mounted near to the waistline of the door; wherein the light source is mounted between a sill portion of the inner door casing and an armrest portion of the inner door casing; and wherein the inner door casing has an aperture into which is fitted a light housing, and the light source is mounted in the light housing.

2. The system as claimed in claim 1 further comprising a sensor to sense whether the door is open or closed and the light source is automatically illuminated whenever the door is sensed to be open.

3. The system as claimed in claim 1, wherein the light source is comprised of a number of discrete lamps arranged in one or more rows substantially horizontally along the door.

4. The system as claimed in claim 1, wherein the light source is an array of LEDs.

5. The system as claimed in claim 4, wherein the array of LEDs includes LEDs of differing color so that the color of the light emitted by the light source can be changed.

6. The system as claimed in claim 1, wherein the system further comprises at least one human machine interface to control operation of the light source.

7. The system as claimed in claim 5 wherein at least one human machine interface is operable by a user of the motor vehicle to change the color of the light emitted from the light source.

8. The system as claimed in claim 1, wherein the light source is operable at More than one intensity.

9. The system as claimed in claim 8, wherein the light source is operable at least at a high intensity and a low intensity.

10. The system as claimed in claim 9, wherein the light source is operated at a high intensity when the door is opened to illunminate the ground in the vicinity of the door opening.

11. The system as claimed in claim 8, wherein a human machine interface is operable to control the illumination state of the light source when the door is closed.

12. The system as claimed in claim 11, wherein the illumination state includes whether the light source is switched on or off.

13. A motor vehicle comprising: a door; and
light sources arranged in a recess in an inner door casing of the door; wherein when the door is in a closed position, light is directed from the light sources in a downward direction to illuminate an interior of the motor vehicle, and when the door is in an opened position, light is directed from the light sources in a downward direction to illuminate ground adjacent the vehicle; wherein the light sources are mounted near to the waistline of the door; wherein the light sources are mounted between a sill portion of the inner door casing and an armrest portion of the inner door casing; and wherein the inner door casing has an aperture into which is fitted a light housing, and the light sources are mounted in the light housing.

14. The motor vehicle as claimed in claim 13, wherein the vehicle includes a number of passenger doors to permit ingress and egress from the motor vehicle and each passenger door includes a light source fitted to the inner side of the door and at least one human machine interface is provided to control the operation of the light sources.

15. The motor vehicle as claimed in claim 13, wherein the light source is arranged below a waistline of the door.

16. The motor vehicle as claimed in claim 13, wherein the light sources extend in one or more rows and are arranged substantially horizontal within the recess, and wherein the recess functions as a light guide channel and has an outer wall that forms a shade to prevent light generated by the light sources from being directed in an upward direction.

* * * * *